United States Patent [19]
Weber

[11] Patent Number: 4,963,811
[45] Date of Patent: Oct. 16, 1990

[54] METHOD AND APPARATUS FOR POWERING ELECTRICAL AND ELECTRONIC CONSUMING DEVICES WITH SOLAR ENERGY

[76] Inventor: Hans R. Weber, 10, chemin du Grillon CH-1007, Lausanne, Switzerland

[21] Appl. No.: 282,520

[22] Filed: Dec. 12, 1988

[30] Foreign Application Priority Data

Dec. 10, 1987 [CH] Switzerland .................. 4840/87

[51] Int. Cl.$^5$ .................. H02J 7/00; H02J 9/00
[52] U.S. Cl. .................. 320/1; 136/293; 307/66; 320/14; 323/906
[58] Field of Search .................. 320/2, 13, 14, 61, 1; 307/66; 323/906; 136/293

[56] References Cited

U.S. PATENT DOCUMENTS

| | | | |
|---|---|---|---|
| 4,136,309 | 1/1979 | Galberth et al. | 323/906 X |
| 4,314,198 | 2/1982 | Rogers | 323/906 X |
| 4,401,935 | 8/1983 | Yerkes | 320/14 X |
| 4,709,200 | 11/1987 | Ochiai | 323/906 X |
| 4,714,868 | 12/1987 | Maruyama et al. | 323/906 X |
| 4,785,226 | 11/1988 | Fujisawa et al. | 323/906 X |

Primary Examiner—R. J. Hickey
Attorney, Agent, or Firm—Sherman and Shalloway

[57] ABSTRACT

In order to provide the required electric power uninterruptedly to an electrical or electronic consuming device (M) powered by solar cells (1, 2, 3, 4), the supply of power to the consuming device must be assured even under inadequate illumination conditions and/or during brief failures of the solar collector (S), an electronic system is proposed wherein a control circuit (RK) is provided between the solar collector (S), the consuming device (M), and an electrical energy storage device (C1). The control circuit (RK) functions at least as a connecting and commutating switching device which, subject to the priority of maintaining the operational readiness of the consuming device (M); provides various interconnections of the solar collector (S), the storage device (C1), and the consuming device (M). The control circuit (RK) makes these various connections in dependence on (1) the voltage ($U_S$) at the solar collector (S), (2) the voltage ($U_M$) required for operation of the consuming device (M), and (3) the state of charge of the storage device (C1). In this way, it is possible to maintain desired conditions (i.e., operation of the consuming device) during brief failures of the solar collector (S) when the illumination is inadequate. At the same time a situation can be avoided wherein the consuming device (M) can only receive adequate electric power after the capacitor (C1) has been charged to the specified operating voltage ($U_M$) of the consuming device by the solar collector (S). Thus, the invention makes it possible to avoid the drawbacks of previously known solar power delivery circuits and at the same time enables optimum utilization of the incident light as an energy source for electrical consuming devices.

19 Claims, 3 Drawing Sheets

METHOD AND APPARATUS FOR POWERING ELECTRICAL AND ELECTRONIC CONSUMING DEVICES WITH SOLAR ENERGY

BACKGROUND OF THE INVENTION

1. Field Of The Invention

The invention relates to a method for powering electronic circuits equipped with solar cells, and an apparatus for accomplishing the method. The invention also relates to use of a power supply system for electronic circuits equipped with solar cells.

2. Description of the Prior Art

Electrical and electronic devices which operate independently of power mains, some of which devices are equipped with digital displays, have long been known. As a rule, their circuits and displays (with modern displays ordinarily being of the liquid crystal type) are supplied with voltage and current even today by batteries of the standard or storage type. Batteries are particularly used where reliable means of powering the circuits and/or displays must be furnished which operate without interruption over a relatively long period, and possibly under unfavorable light conditions. Accordingly, devices powered by solar cells, particularly measuring devices powered by solar cells, have been little used. Current knowledge holds that batteries present an environmental hazard, particularly when disposed of incorrectly. In applications where solar cells are successfully employed, as a rule the circuits supplied have low power demand and are only required to function under conditions where a certain minimum level of illumination is present. In the event of darkness, the information in these circuits is lost and the displays disappear. In applications where there are periods of interruption of illumination during which operation must continue, storage batteries are provided which the solar cells serve to charge and which in turn provide the power for the circuits and/or displays. An inherent disadvantage of such apparatus is that under conditions of extended interruption in operation or extended darkness, the storage batteries discharge, and as a rule they require several hours to recharge, thereby making the devices unavailable during a fairly long period at the start of the charging cycle.

SUMMARY OF THE INVENTION

An underlying object of the present invention is to devise a method of powering electronic circuits with solar energy and to devise an apparatus for accomplishing the method, whereby it is possible to fully utilize all the advantages of the electronic devices while avoiding the disadvantages of arrangements wherein the devices are electrically powered by batteries (i.e., which may be solar cells) with directly connected storage batteries. A further object of the invention is that the inventive apparatus should be able to power the consuming device with voltage and current even under intermittent periods of (total) darkness. In an advantageous variant, the inventive apparatus should be able to maintain a constant operating voltage in the measuring device over a specified period, regardless of whether or not the solar cells are delivering current and voltage. Further, in another variant embodiment the inventive apparatus should serve as a voltage limiter for the storage device. Further, it should be able to switch off the consuming device and prevent further discharge of the storage device if a prescribed minimum voltage is no longer achieved.

According to the present invention, a method is set forth for powering an electrical or electronic consuming device equipped with a solar collector in which the consuming device is connected to either the solar collector or a storage device, such as a capacitor or a chargeable battery, so as to provide the consuming device with a power supply, and the solar collector is connected to either the storage device or the consuming device so as to operate the consuming device. Which of these connections is to be made is determined in dependence on the amount of voltage and/or current delivered from the solar collector, the state of charge of the storage device, the voltage necessary for operation of the consuming device and a previously defined switching priority.

One skilled in the art will appreciate that according to the invention the three components—solar collector, storage device, and consuming device—can be interconnected in such away that, depending on the operating voltage of the consuming device, the variable production state of the solar collector, and the variable charging state of the electrical energy storage device, at a given instant those components can be electrically connected in such a way as to provide optimal conditions in which operation of the consuming device is given priority.

Examples of the various aspects of the invention will be illustrated in the following description, with reference to the drawings.

BRIEF DESCRIPTION OF THE DRAWING FIGURES

DETAILED DESCRIPTION OF THE INVENTION

To carry out the object of the invention, a method is proposed according to which, depending on the voltage and current delivered by the solar collector, and the state of charge of the storage device, and the desired operating voltage of the consuming device which is to be powered, one of the following arrangements is effected:

Only the solar collector is connected to the consuming device, preferably via a voltage regulator; or Only the storage device is connected to the consuming device, preferably via a voltage regulator.

The solar collector may also be connected to the storage device to charge the storage device, in situations where sufficient power cannot be drawn from the solar collector to operate the consuming device or if the consuming device is switched off. In this way provision can be made such that whenever the light incident on the solar cells is sufficient to produce voltage and current, such light will be optimally used, either to power the consuming device (which according to one embodiment is a measurement circuit) or to charge the storage device (preferably a capacitor). In the process, powering the consuming device is given priority over charging the storage device, so that time intervals during which the consuming device is not operationally ready are minimized and are limited to periods during which the consuming device could not operate anyway due to inadequate light. Additional aspects of the inventive method will be apparent to one skilled in the following art from a reading of the description of the inventive apparatus. The apparatus will hereinafter generally be referred to as the "electronic system".

Figure 1:
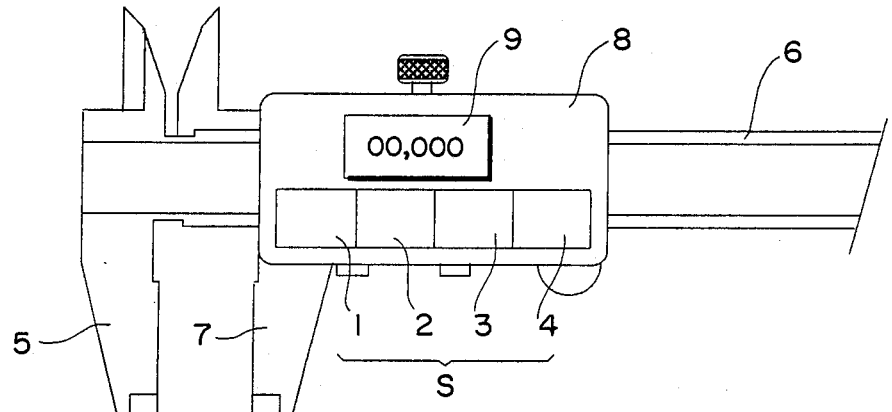
FIG. 1 illustrates a pair of calipers with a digital liquid crystal display power by several solar cells.

FIG. 1 shows a pair of calipers with digital readout, having a fixed arm 5, a second arm 7 slidable on a measuring rail 6, and a housing 8 borne on arm 7, which housing 8 accommodates:

an electronic measuring system,
a digital liquid crystal display 9, and
a solar collector S comprised of several solar cells (1-4) connected in series.

The mechanical structure and electronic circuit of the measuring system, and the display, are not the subjects of the invention; thus, the consuming device per se is not part of the inventive concept Accordingly, these elements will not be discussed in further detail. The consuming device (the electronic circuit to be supplied with voltage and current) will generally be designated with the reference symbol M in the following description, and is so designated in FIGS. 2-6. The consuming device need not be a measuring system for calipers. Any other electronic circuit (whether or not for a measuring instrument), or any other electrical consuming device in general, may be supplied with electrical power (voltage and current) by the inventive electronic system, given appropriate adaptation. The number and interconnection of the solar cells to form a solar collector can be adjusted to the requirements and lighting conditions, in a manner which is known.

Figure 2:
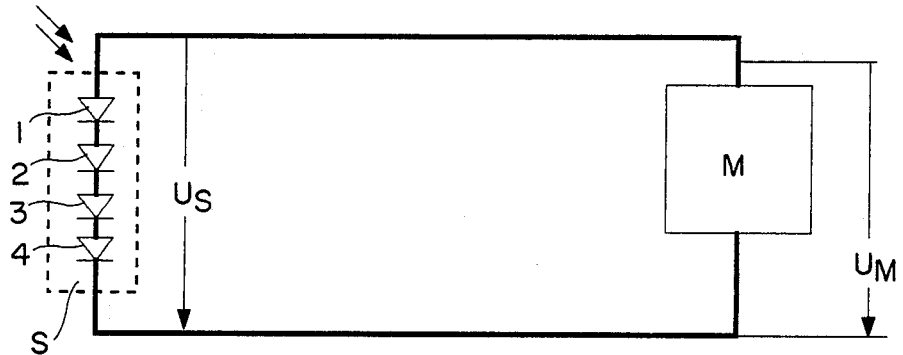
FIG. 2 illustrates a known rudimentary circuit for operating an electrical consuming device by means of solar energy.

FIG. 2 illustrates a rudimentary circuit for powering a consuming device M by solar cells (1-4) interconnected to form a solar collector S. With this basic system, the consuming device M begins to function as soon as the voltage $U_S$ of the solar collector S (i.e. of the solar cells 1-4 connected in series) reaches the established minimum operating voltage $U_M$ for the consuming device M. Accordingly, the consuming device M will always operate correctly if sufficient light is incident on the solar collector S. Interferences with incident light, e.g. shadows falling on the solar collector S, of even very short duration, will result in interruption of the production of voltage and current, and therefore interruption in the functioning of the consuming device M. For this reason, such rudimentary circuits are generally used only for consuming devices for which an interruption in function will not cause a false reading or erroneous operation. In particular, such a rudimentary circuit is unsuitable for furnishing a digital measuring device with electric power.

Figure 3:
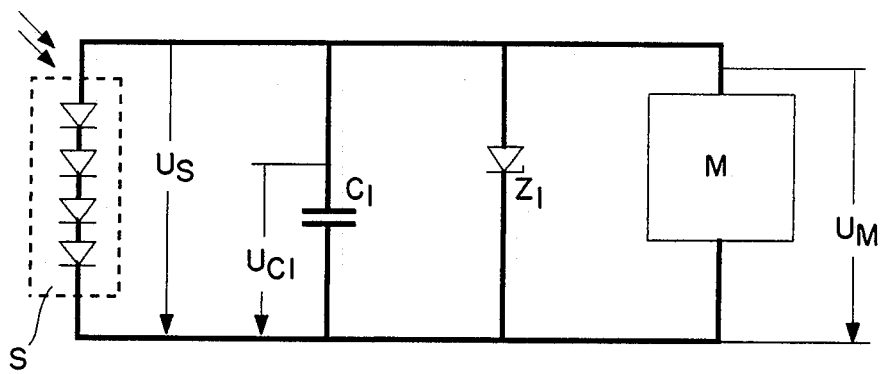
FIG. 3 illustrates a known circuit similar to that in FIG. 2 but expanded to include a chargeable storage device and means of limiting voltage.

For such a purpose a circuit according to FIG. 3 is much better, because a capacitor C1 is connected in parallel with the solar collector S and serves as a chargeable storage device for current at variable voltage. As soon as and as long as the voltage $U_{C1}$ across the capacitor C1 is equal to or greater than the operating voltage $U_M$ required for correct operation of the consuming device M, the consuming device will function even if the solar cells (1-4) briefly fail to deliver sufficient electric power. The disadvantage of this known circuit is that the consuming device M does not begin to function immediately after sufficient light is incident on the solar cells (1-4), because it is first necessary for the capacitor C1 to be charged to the operating voltage $U_M$. Depending on the capacitance of the capacitor C1 and the amount of current and voltage delivered by the solar collector S, a substantial time may pass before the consuming device M begins to function. Thereafter it will continue to function correctly without interruption despite brief failures of production of current and voltage from the solar collector S. A zener diode Z1 may also be provided, to limit the operating voltage $U_M$ at the input of the consuming device M.

Figure 4:
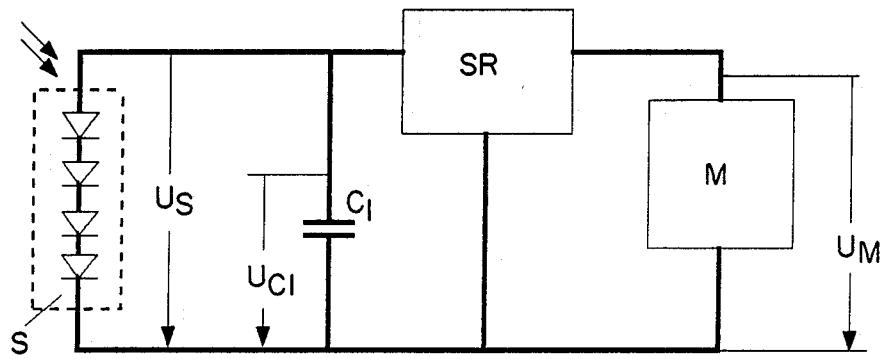
FIG. 4 is a schematic of another known circuit, having solar cells, a storage device, a consuming device, and a series regulating circuit.

According to FIG. 4, a voltage regulator SR may be employed instead of the zener diode Z1. Such a regulator, in the form of an integrated circuit, is widely known and referred to as a "series regulating circuit". Unlike the zener diode Z1, it does not convert the excess voltage at the output of the solar collector S (or capacitor C1) into heat (which represents energy lost), but instead it keeps the voltage difference ($U_{C1} - U_M$) available as a reserve.

Figure 5:
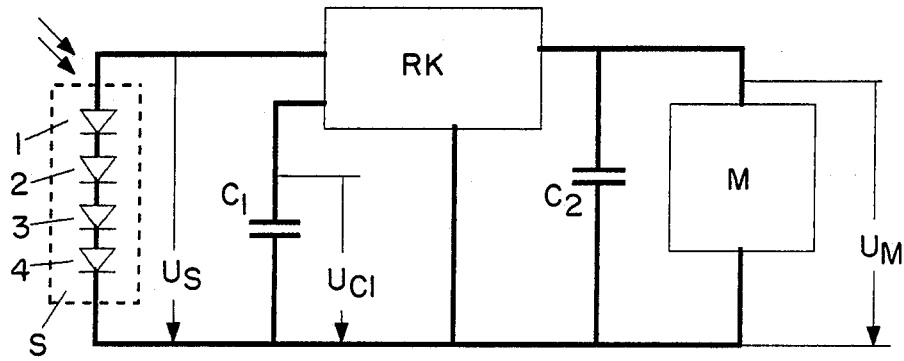
FIG. 5 is a schematic of the inventive apparatus in the form of an electronic system with regulating circuit.
Figure 6:
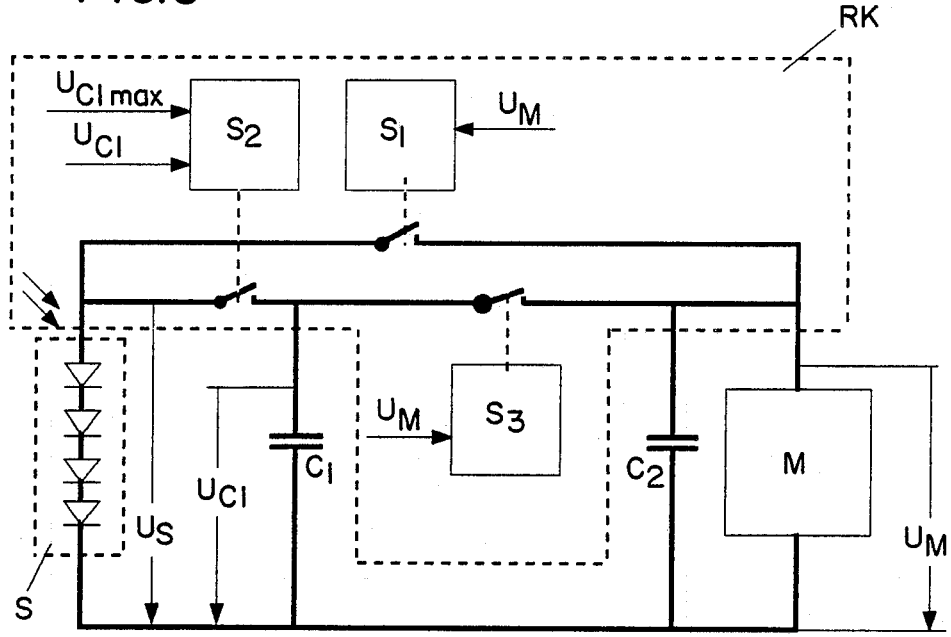
FIG. 6 is a block circuit diagram indicating the principle structure of the control circuit.

The inventive electronic system according to FIG. 5 comprises not only the solar cells (1-4) which serve as sources of current and voltage, and the capacitor C1 serving as a energy-storage device with variable voltage, and a second capacitor C2 serving as a charge transfer device but also a control circuit RK. The control circuit RK serves at least to ensure that the required operating voltage $U_M$ is available at the input of the consuming device M immediately after the solar collector voltage $U_S$ and the solar collector current (i.e. the solar collector power) reach the values required for proper functioning of the consuming device M. Only if and when the solar collector S provides more electric power than that required for properly operating the consuming device M does the control circuit connect the storage device (here the capacitor C1) to the solar collector S. Thus, according to the invention the capacitor C1 is subjected to charging only if and when the interconnected solar cells (1-4) deliver more power than required for proper functioning of the consuming device M (i.e., excess power). As soon as the power to the consuming device M becomes inadequate due to brief shading of the solar collector S or a temporary failure of the light, the control circuit connects the capacitor C1 to the consuming device M with no interruption, whereby even in the event of a failure of current and voltage supply by the solar collector S, the consuming device continues to function properly as long as the capacitor C1 can deliver sufficient voltage and current.

A control circuit RK of the type described above is illustrated in FIG. 6 in the form of a block circuit diagram. One skilled in the art will recognize a first electronic switch S1 which connects the consuming device M to the solar collector S when said collector is able to deliver the operating voltage $U_M$ and current sufficient for proper operation of the consuming device M. A second electronic switch S2 connects the storage device (which is in the form of the capacitor C1) to the solar collector S when said collector is delivering a voltage $U_S$ which is at least greater than the required operating voltage $U_M$ and when, at the same time, the current produced is greater than the required operating current of the consuming device M. When a maximum capacitor charging voltage $U_{C1max}$ is attained, i.e. when the storage device (i.e. the capacitor C1) is fully charged, the switch S2 disconnects the capacitor C1 from the solar collector S again, in order to avoid overcharging of the capacitor C1 which may damage the capacitor. By means of a third electronic switch S3 the capacitor C1 is connected to the consuming device M if and when the voltage $U_S$ across the solar collector S is lower than the required operating voltage $U_M$ and at the same time the voltage across the capacitor C1 is at least equal to the required operating voltage $U_M$. Advantageously the two electronic switches S1 and S2 are also in the form of voltage regulators which deliver regulated output voltages equal to the required operating voltage $U_M$. This may be achieved, e.g., by controlling the times (dutycycles) during which they are connected to the power source. For an illustration of this, see the two curves S1 and S2 in FIG. 7 (and also the curve S3 for switch S3).

The inventive electronic system provides—even in its simplest embodiment described supra—the advantage over the known circuits according to FIGS. 3 and 4 that the consuming device M does not suffer any delay in being powered which delay is due to the process of recharging the storage device (e.g. capacitor C1).

In a first expanded variant embodiment of the inventive electronic system, it may be provided that the control circuit RK, in addition to its above-described functions of switching components into connection with the power source and with each other, also acts as a timing circuit, whereby after a prescribed time during which the solar cells (1–4) are not delivering sufficient voltage for the consuming device M to operate properly, circuit RK disconnects the consuming device M or part of it, in order to save energy and to avoid unnecessarily discharging the storage device (which may be a capacitor or a storage battery). This feature is useful when the apparatus equipped with the inventive electronic system is, e.g. put away in a drawer, where no light reaches it and where it no longer needs to function; or when, e.g., the apparatus is operating in a dark work location where in any event it is impossible to read the display because of inadequate lighting.

Figure 7:
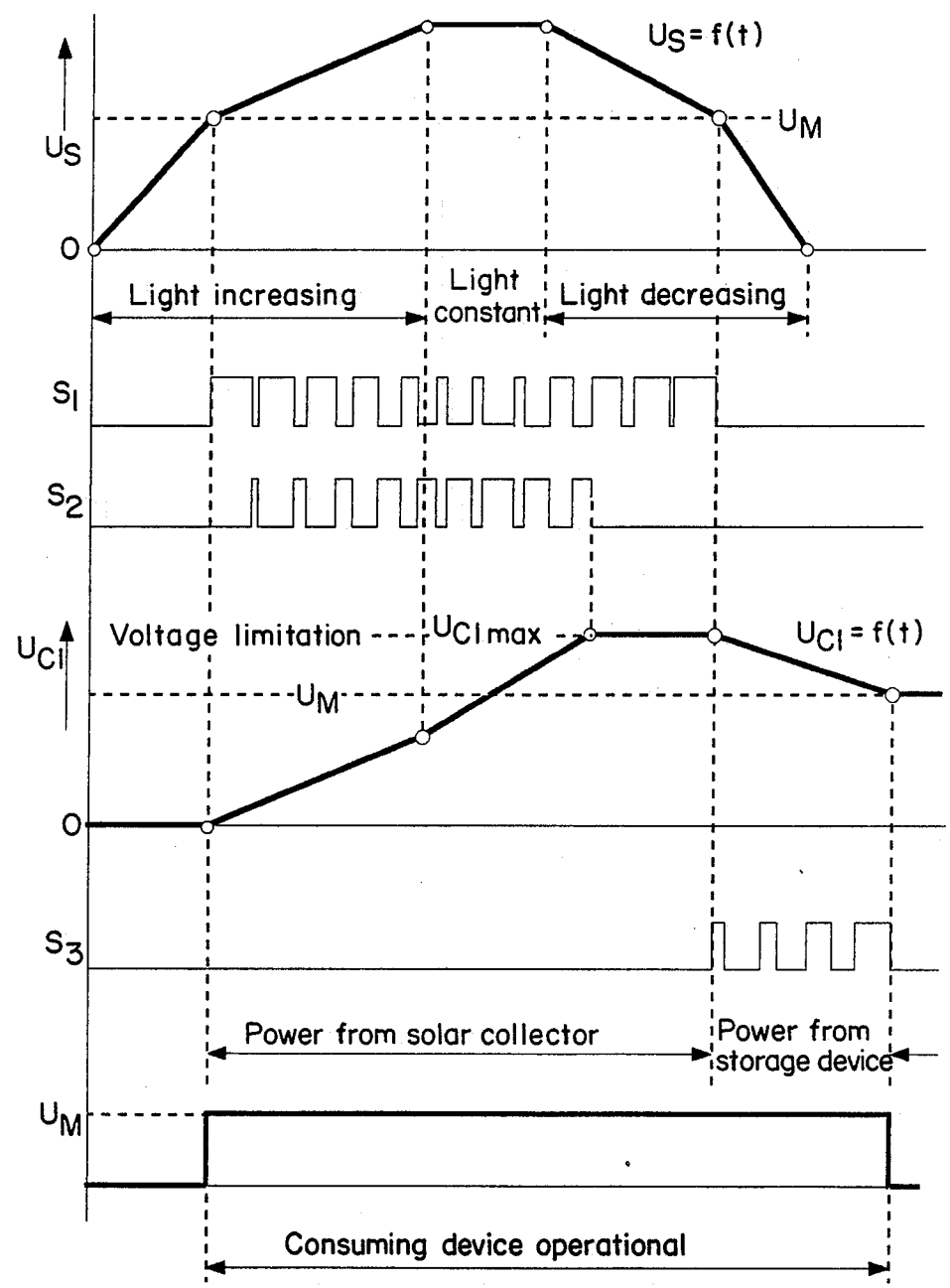
FIG. 7 illustrates plots of voltage and the control functions of the inventive electronic system versus time, for a hypothetical course of illumination of the solar cells.

Alternatively, the control circuit may be designed such that when illumination is absent or inadequate the control circuit supplies the consuming device M with electric power from the storage device (here the capacitor C1) until the required operating voltage $U_M$ can no longer be delivered to the consuming device M (see the diagrams in FIG. 7).

In a second expanded variant embodiment of the inventive electronic system, the control circuit RK may be designed such that it additionally maintains the operating voltage $U_M$ of the consuming device M at a predetermined precisely specified value, regardless of the intensity of light incident on the solar collector S. The purpose of this voltage control is, e.g., to avoid erroneous results due to variations of voltage or current when an electronic measuring system is employed. Further, the control circuit may serve as a switch for a warning signal, whereby when the illumination is insufficient, i.e., when the solar collector S can no longer provide a specified voltage $U_S$ but before $U_{C1}$ has fallen to the specified value $U_M$, the control circuit causes the warning signal to appear before the circuit RK shuts off part of or all of the consuming device M.

The above disclosures enable a person skilled in the art to design a control circuit RK which can perform additional functions, with no activity which rises to the inventive level being required of such skilled person. No detailed description of concrete designs of individual blocks are presented here. This omission is intentional, on grounds that a qualified electronic engineer given the description of the functions can in fact come up with appropriate circuits. Further, the circuits may be embodied in numerous variations and can be produced by various techniques, e.g. they may be in the form of integrated circuits.

One skilled in the art will appreciate that the inventive electronic system makes it possible for the first time to combine all of the advantages of solar collectors with those of circuits powered by batteries or storage batteries, while avoiding disadvantages which heretofore have not been overcome. One skilled in the art will also readily appreciate that the application possibilities of the inventive electronic system are not confined to calipers or measuring devices in general, but extend over a wide range of electronic devices which require internally supplied power.

What is claimed is:

1. A method for powering an electrical or electronic consuming device equipped with a solar collector, comprising the steps of:

connecting the consuming device to either the solar collector or a storage device so as to provide the consuming device with a power supply; and connecting the solar collector to either the storage device so as to charge the storage device and the consuming device so as to operate the consuming device or the consuming device so as to operate the consuming device; and making the above connections in dependence on the following criteria:

the power delivered from the solar collector;

the state of charge of the storage device;

the power necessary for operation of the consuming device; and a previously defined switching priority comprising the proviso that: when the power delivered from the solar collector is just equal to the power necessary for operation of the consuming device, only the consuming device will be connected to the solar collector.

2. A method according to claim 1, wherein the defined switching priority further comprises the proviso that:

when the power delivered from the solar collector is greater than the power necessary for operation of the consuming device, both the storage device and the consuming device will be connected to the solar collector.

3. A method according to claim 1, wherein the defined switching priority further comprises the proviso that:

when the power delivered from the solar collector is below the power necessary for operation of the consuming device and the state of charge of the storage device is such that it can deliver the power necessary for operation of the consuming device, the consuming device is disconnected from the solar collector and connected with the storage device.

4. A method according to claim 3, wherein the defined switching priority further comprises the proviso that:
when the state of charge of the storage device is such that it can no longer deliver the power necessary for operation of the consuming device, the consuming device is disconnected from the storage device.

5. A method according to claim 1, wherein the power delivered from the solar collector is regulated to be the power necessary for operation of the consuming device.

6. A method according to claim 5, wherein the power delivered from the storage device is regulated to be the power necessary for operation of the consuming device.

7. A method according to claim 6, wherein the power necessary for operation of the consuming device is a range of powers.

8. A method according to claim 1, wherein when the storage device is connected to the solar collector, the power delivered to the storage device is regulated to be less than or equal to a maximum permissible charging power for the storage device.

9. A method according to claim 7, wherein when the storage device is connected to the solar collector, the power delivered to the storage device is regulated to be less than or equal to a maximum permissible charging power for the storage device.

10. The method according to claim 8, wherein the storage device comprises at least one capacitor.

11. An electronic system for powering an electrical or electronic consuming device, comprising:
solar collector means for collecting solar energy and delivering electrical power;
storage means for storing electrical energy; and
control means for connecting said consuming device to either said collector means or said storage means, and for connecting said collector means to either said storage means and said consuming device or said consuming device, such that:
when the power delivered from the solar collector is just equal to the power necessary for operation of the consuming device, only the consuming device will be connected to the solar collector, and
when the power delivered from the solar collector is greater than the power necessary for operation of the consuming device, both the storage device and the consuming device will be connected to the solar collector, and
when the power delivered from the solar collector is below the power necessary for operation of the consuming device and a state of charge of the storage device is such that it can deliver the power necessary for operation of the consuming device, the consuming device is disconnected from the solar collector and connected with the storage device, and
when the state of charge of the storage device is such that it can no longer deliver the power necessary for operation of the consuming device, the consuming device is disconnected from the storage device.

12. An electronic system according to claim 11, wherein when said collector means is only connected to said consuming device, said control means regulates the power delivered from the solar collector to be the power necessary for operation of said consuming device.

13. An electronic system according to claim 12, wherein when said storage means is connected to said consuming device, said control means regulates the power delivered from said storage means to be the power necessary for operation of said consuming device.

14. An electronic system according to claim 13, wherein the power necessary for operation of said consuming device is a range of powers.

15. An electronic system according to claim 11, wherein when said storage means is connected to said collector means, said control means regulates the power delivered to the storage means to be less than or equal to a maximum permissible charging power for said storage means.

16. An electronic system according to claim 14, wherein when said storage means is connected to said collector means, said control means regulates the power delivered to the storage means to be less than or equal to a maximum permissible charging power for said storage means.

17. An electronic system according to claim 15, wherein said storage means comprises at least one capacitor.

18. An electronic system according to claim 2, wherein said consuming device is an electronic digital caliper device.

19. A method according to claim 1, wherein said consuming device is an electronic digital caliper device.

* * * * *